United States Patent

Howard

[11] Patent Number: 5,810,093
[45] Date of Patent: Sep. 22, 1998

[54] MULTI-PURPOSE LANDSCAPING DEVICE FOR USE WITH A HAND-HELD ROTARY POWER TOOL

[75] Inventor: Herman S. Howard, Hallandale, Fla.

[73] Assignee: Media Group, Stamford, Conn.

[21] Appl. No.: 725,537

[22] Filed: Oct. 3, 1996

[51] Int. Cl.[6] ............................................. A01B 33/06
[52] U.S. Cl. ........................ 172/111; 172/41; 172/378; 172/381; 30/276
[58] Field of Search .......................... 172/111, 41, 378, 172/381; 56/12.1, 12.7, 239, 233; 30/276

[56] References Cited

U.S. PATENT DOCUMENTS

| | | | |
|---|---|---|---|
| 1,886,560 | 11/1932 | Lee | 172/381 |
| 2,519,779 | 8/1950 | Moon | 172/41 X |
| 2,722,955 | 11/1955 | Roy et al. | 172/41 X |
| 2,779,259 | 1/1957 | Kelsey | 172/111 |
| 3,218,789 | 11/1965 | Ott et al. | 56/233 |
| 3,951,564 | 4/1976 | Montgomery | 408/29 |
| 4,002,207 | 1/1977 | Bartz | 172/378 |
| 4,062,115 | 12/1977 | Lee | 56/12.7 X |
| 4,068,377 | 1/1978 | Kimmel et al. | 56/12.7 X |
| 4,107,841 | 8/1978 | Rebhun | 56/12.7 X |
| 4,122,601 | 10/1978 | Katsuya | 172/41 X |
| 4,179,805 | 12/1979 | Yamada | 56/12.7 X |
| 4,213,504 | 7/1980 | Schneider | 172/25 |
| 4,237,610 | 12/1980 | Bradus et al. | 56/12.7 X |
| 4,286,675 | 9/1981 | Tuggle | 172/41 X |
| 4,338,719 | 7/1982 | Burkholder | 56/12.7 X |
| 4,723,802 | 2/1988 | Fambrough | 172/41 X |
| 4,759,128 | 7/1988 | Katoh et al. | 56/12.7 X |
| 4,790,071 | 12/1988 | Helmig et al. | 56/12.7 X |
| 4,827,702 | 5/1989 | Cerreta | 56/12.7 |
| 4,832,131 | 5/1989 | Powell et al. | 172/41 X |
| 4,856,194 | 8/1989 | Lee | 56/12.7 X |
| 4,964,472 | 10/1990 | Cleworth | 56/239 X |
| 5,031,395 | 7/1991 | Ohkanda et al. | 172/41 X |
| 5,048,278 | 9/1991 | Jones et al. | 56/12.7 X |
| 5,136,782 | 8/1992 | Calcinai | 56/12.7 X |
| 5,188,340 | 2/1993 | Green | 172/378 X |
| 5,239,758 | 8/1993 | Lindell | 30/500 |
| 5,261,496 | 11/1993 | Smotherman | 172/25 |
| 5,330,010 | 7/1994 | Smotherman | 172/25 |
| 5,452,767 | 9/1995 | Smotherman | 172/25 |
| 5,461,787 | 10/1995 | Araki et al. | 56/12.7 X |
| 5,471,824 | 12/1995 | Neely | 56/12.7 X |
| 5,491,963 | 2/1996 | Jerez | 56/17.1 |

*Primary Examiner*—Terry Lee Melius
*Assistant Examiner*—Victor Batson
*Attorney, Agent, or Firm*—Evelyn M. Sommer

[57] ABSTRACT

A multi-purpose landscaping device for use with as hand-held rotary power tool such as an electric drill includes a shaft adaptable at one end for removable and operative connection to such a power tool, and a rotatable implement removably attached to the other end of the shaft, so that replacement of the rotatable implement is possible without replacement of the shaft. The rotatable implement is selected from the group consisting of a greenery cutter, a blower, a pruner, a soil augur and a weed extractor.

23 Claims, 7 Drawing Sheets

MULTI-PURPOSE LANDSCAPING DEVICE FOR USE WITH A HAND-HELD ROTARY POWER TOOL

FIELD OF THE INVENTION

This invention relates to a multi-purpose landscaping device having a shaft that is adapted at a first end for use with a hand-held power tool such as a portable hand drill, and adapted at a second end for the removable attachment of interchangeable, diverse gardening implements. In particular, the interchangeable, diverse gardening implements are such that the apparatus functions as a grass, weed and shrub trimmer, a grass, dirt and leaf blower, a pruning saw, a soil augur and cultivator, and a weed extractor.

BACKGROUND OF THE INVENTION

In the past, hand-held powered grass, weed and shrub trimmers, blowers, pruning saws, soil augurs, soil cultivators and weed extractors have been developed. Typically, these devices have included self-contained power sources such as liquid fuel-driven motors, or have included electro-mechanical actuators capable of being powered by a typical household electrical outlet. As a result, such devices have incorporated internal combustion engines, electrical motors, switches and other mechanical and electrical gadgetry at additional and unnecessary expense to consumers.

This problem has been addressed, for example, in Aman, U.S. Pat. No. 3,554,293, issued Jan. 12, 1971, which discloses a rotary weeding and edging device, having an interchangeable shaft, for use with a hand-held, electrical power drill commonly sold for domestic use. Because electrical hand drills are commonly owned domestic products, this type of design affords many consumers the economy of purchasing a gardening attachment independent of a power source or actuator, and at a lower price than would otherwise be possible. Effectively, consumers owning a hand-held power drill are able to avoid the cost of purchasing another power source or actuator.

This improvement notwithstanding, tools such as that described in the Aman patent suffer from several disadvantages. One significant disadvantage is that the rotating implements are fixed to the rotating shaft and can only be changed or replaced by replacing the entire shaft, resulting in (1) an increased cost for the rotating implements because they must be purchased along with a shaft, and (2) significant inconvenience to the user, who must waste both time and effort in exchanging the entire shaft in order to change the rotating implement. Thus, there is a need for a gardening device having rotatable implements that can be conveniently and inexpensively replaced without the need to exchange the entire shaft.

Another significant disadvantage of prior art tools such as that described in the Aman patent arises from the fact that the shaft is integrally formed with or integrally attached to the rotatable implement. Because the shaft is characteristically long and thin and must generally be constructed of a torsionally strong material, such as a metal, the integral rotatable implement must usually also be constructed of such a material. This results in a more costly rotatable implement, and certainly one which cannot be considered disposable or replaceable after a few uses. Accordingly, there is a need for a gardening device having rotatable implements that are interchangeable independently of a drive shaft, and that are constructed of inexpensive materials, such as plastics, such that they may be readily replaced.

Yet another significant disadvantage of prior art tools generally, and tools such as that described in the Aman patent particularly, is that like previous designs having self-contained power sources or actuators, such designs are not adaptable for more than a small number of gardening uses. This results in the need for many power gardening tools in order to perform each of the many common gardening tasks, which is both inconvenient and unnecessarily expensive. For example, the Aman patent discloses a tool with an interchangeable shaft permitting a user to perform one of two gardening activities—weeding or edging—depending upon which shaft is in place. Consumers must purchase further tools for mowing, branch pruning, digging weeds, cultivating soil, digging holes, trimming grass and shrubs, and blowing grass, leaves and the like. Thus, there is a need for a gardening tool capable of accepting many different types of attachments for performing many different types of gardening tasks.

Still another significant disadvantage of prior art tools such as that described in the Aman patent is that although such tools may provide attachments for performing one or two gardening functions, such functions are not diverse, thus limiting the gardening activities of the user. By way of example, the attachments described in the Aman patent permit weeding and edging, two closely related functions. Thus, to perform multiple diverse functions such as weeding and branch pruning, or edging and cultivating, or weeding and leaf blowing, consumers have heretofore been required to purchase several tools. Accordingly, there is a need for a gardening device capable of accepting diverse attachments for performing diverse types of gardening tasks.

The availability of a gardening device compatible for use with a common hand-held rotary power tool and capable of supporting many different and diverse gardening implements, such implements that are replaceable independently of the drive shaft of the device, would provide consumers with significant economic benefits. It would afford consumers a great economic advantage in effectively not requiring the purchase of a power source or actuator in order to purchase a power garden tool, and in not requiring the replacement of the entire shaft of the device when replacing the rotatable implements. It would also save users considerable effort in replacing the rotatable implements, because only the rotatable implement alone, and not the shaft, would need to be removed and replaced. Further, it would prevent the need for consumers to purchase several devices for performing diverse gardening activities by enabling the performance of several diverse gardening activities, such as weeding, branch pruning and leaf blowing, using one gardening tool.

Accordingly, one object of the present invention is to provide a gardening device having rotatable implements that can be conveniently and inexpensively replaced without the need to exchange the entire shaft.

Another object is to provide a gardening device having rotatable implements that are constructed of inexpensive materials such as plastic.

A further object of the invention is to provide a gardening implement that does not include an integral power source or actuator, but rather is powered by a hand-held power tool of the type that may be commonly found in the home, and that is capable of many gardening uses, several of which activities are diverse and dissimilar from one another.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is directed to a multi-purpose landscaping device for use with a hand-held rotary power tool. According to the present invention, the landscaping device comprises a shaft that is configured on one end to attach to a hand-held rotary power tool. The device also comprises a rotatable implement which removably attaches to the end of the shaft opposite the hand-held power tool. Preferably, the rotatable implement may be a greenery cutter, for trimming grass, weeds, shrubs and the like; or the rotatable implement may be a blower, a pruner, a soil augur (hole digger and soil cultivator), or a weed extractor. Also preferably, the rotatable implement is made of plastic or a similarly low-cost material.

In accordance with the aspect of the present invention wherein the rotatable implement is a greenery cutter, the greenery cutter may preferably comprise a base portion with a cylindrical portion that is fixedly and perpendicularly attached to the base portion, and a plurality of greenery trimming blades removably attached to the base portion, so that the blades will rotate with the base which will rotate with the shaft of the device. It can be appreciated that while trimming blades form part of the above-described embodiment, the cutter may be provided with wire or plastic filament as equivalents of such blades.

According to another preferred aspect of the present invention, in which the rotatable implement is a blower, the blower includes an impeller.

In yet another preferred aspect of this invention, the rotatable implement is a pruner comprised of a circular trimming saw. Advantageously, in this embodiment, the device may include a saw guard having a blade guard portion that encompasses the trimming saw for protecting its user from the rotating blade, and a branch guide portion exposing the trimming saw, permitting access of the blade to branches and the like. This branch guide portion would also include a guide channel for guiding branches to be trimmed to the rotating blade, and for preventing the device from deflecting when the blade contacts such a branch. The saw guard would be mounted to the gardening device proximate to the end of the rotating shaft opposite the end engaging the hand-held rotary power tool.

In still another preferred aspect of this invention, in which the rotatable implement is a weed extractor, one end of the weed extractor is semi-cylindrical in cross-section and is adapted for fixedly and removably connecting to the end of the rotating shaft. The other end of the weed extractor has a blade which is longitudinally curved and laterally curved, and which has a plurality of teeth.

As yet another preferred aspect, the rotatable implement is a soil augur and cultivator having a base portion and a cylindrical portion fixedly and perpendicularly attached to the base portion. The base portion has a plurality of auguring blades integral to the base portion, and which are disposed downward, away from the second end of the rotating shaft and toward the earth to be worked.

Still other objects and advantages of the present invention will become readily apparent to those skilled in this art from the following detailed description, wherein only the preferred embodiment of the invention is described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

Figure 1:
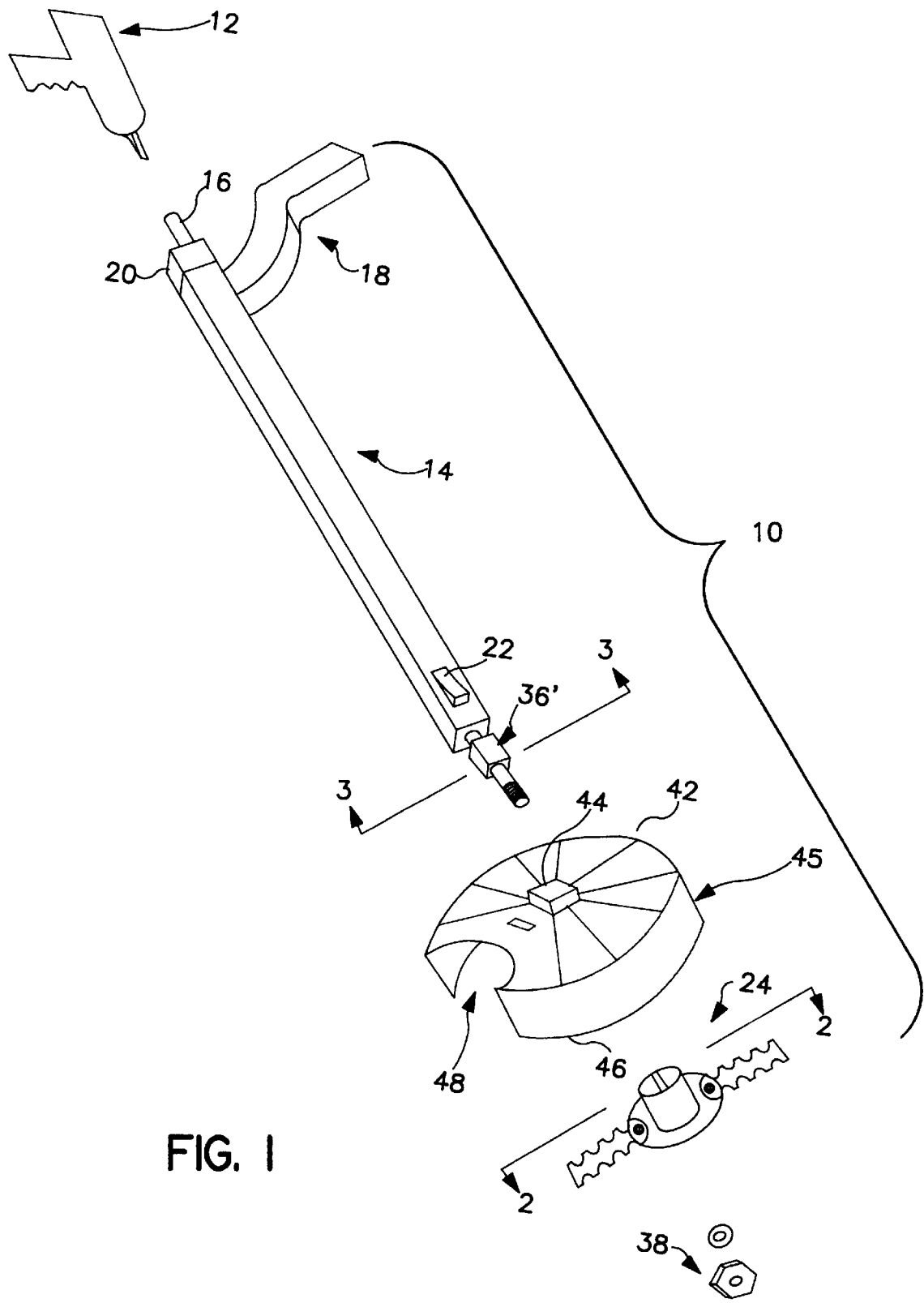
FIG. 1 is a perspective view of a landscaping device in accordance with the present invention, in which the rotatable implement is a greenery cutter.

Referring now to the drawings, a landscaping device with multiple attachments in accordance with the present invention is generally illustrated in FIGS. 1–8. Referring to FIG. 1, by way of example, the landscaping device 10 is positioned for operative engagement with a common household hand drill 12. The device of which the preferred embodiments are illustrated herein may be used in connection with any of a variety of hand-held rotary power tools, which will be obvious to those skilled in the art.

In FIG. 1, the landscaping device 10 is preferably comprised of a shaft housing 14 in which is mounted a shaft 16 which extends through the housing 14 at one end and is configured for engagement with a hand-held rotary power tool such as the drill 12. For connection to the drill 12, for example, the shaft 16 may be circular, or better still, square or hexagonal in shape. The shaft housing 14 preferably has an integrally formed or otherwise attached handle 18, to make the landscaping device 10 easier to move and stabilize during operation. The shaft housing 14 may have a first end cap 20 covering the end of the housing proximate to the drill 12. It is also preferable for the shaft housing 14 to have a latch 22 proximate to the other end of the housing.

Preferably, the shaft housing 14, handle 18 and first end cap 20 are constructed of an inexpensive though durable plastic material. The shaft 16 should be constructed of a material capable of transferring torsional forces from the drill 12.

FIGS. 1–8 illustrate preferred embodiments of the device of the present invention, including, by way of example, preferred rotatable implements that are several in their number and diverse in the character of their possible uses. The following examples are provided for the purpose of aiding in explaining the present invention. Other potential embodiments exist, and the device should not be limited to the description provided herein.

Figure 2:
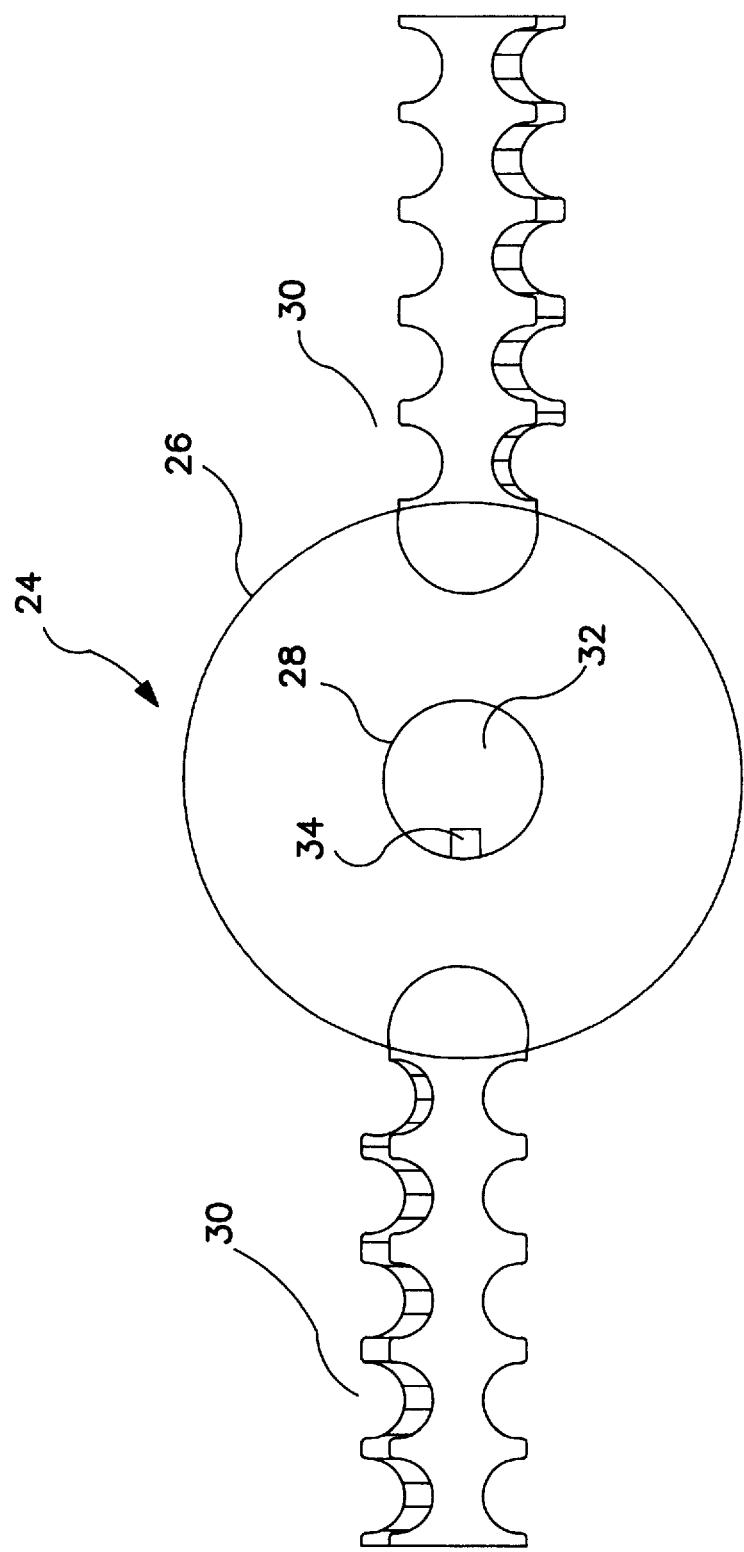
FIG. 2 is an orthographic end view taken along line 2—2 of FIG. 1.

The rotatable implement illustrated in FIGS. 1 and 2 is an example of a greenery cutter 24 usable for trimming grass, weeds, shrubs and the like. As can be seen in FIG. 2, the greenery cutter 24 is comprised of a base portion 26, a cylindrical portion 28 that is perpendicularly and fixedly attached to the base portion 26, and a plurality of greenery cutting blades 30 that are attached to base portion 26 but which can be removed from the base portion 26 and replaced if necessary or desirable due to wear. The cylindrical portion 28 of the greenery cutter 24 has a bore 32 through its center and a key 34 longitudinally positioned in the bore 32. It will be appreciated by those skilled in the art that while trimming blades form part of the above-described embodiment, the greenery cutter 24 may be provided with wire or plastic filament as equivalents of the cutting blades 30.

Figure 3:
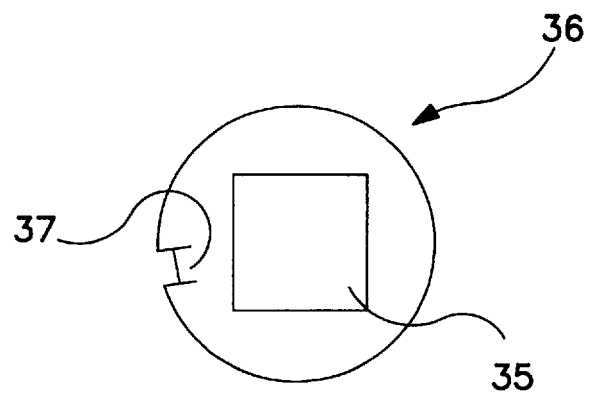
FIG. 3 is an orthographic cross-sectional view taken along line 3—3 of FIG. 1.

As illustrated in FIG. 1, in this example, the greenery cutter 24 may be attached to the shaft 16 by use of an adapter cylinder 36 positioned over the adapter end 36' on shaft 16. The adapter cylinder 36, as illustrated in FIG. 3, has a longitudinal bore 35 through it, through which the adapter end 36' is fitted and the exterior surface of the cylinder 36 has a longitudinal slot 37 made to accept the key 34 longitudinally positioned in the bore 32 of the greenery cutter 24 when the adapter 36 is fitted within the bore 32. The adapter cylinder 36 is fixedly attached to the shaft adapter end 36' on 16 so that when the shaft 16 rotates by virtue of its connection with the drill 12, the adapter cylinder 36 and the shaft 16 will turn in unison.

Once the greenery cutter 24 is attached to the shaft 16 by connection with the adapter cylinder 36, a fastener 38 is used to secure the cutter 24 to the shaft 16 of the device 10. By way of example only, FIG. 1 illustrates such a fastener 38 as a nut which engages threads on the end of the shaft 16, and which is prevented from loosening by a lock washer. Of course, other fasteners could be used, such as pins placed through holes placed in the shaft 16 below the cutter 24, end caps which thread into the end of the shaft 16, or other fasteners that will be obvious to those skilled in the art.

Preferably, a guard housing 42 is provided for protecting users from contact with the greenery cutting blades 30 of the greenery cutter 24. As illustrated in FIG. 1, the guard housing 42 is secured at a first end 44 to the shaft housing 14 by the latch 22 at the end of that housing 14. The guard housing 42 has a second end 45 having a circular lip portion 46 that surrounds the greenery cutting blades 30 in their plane of rotation. The lip portion 46 of the guard housing 42 has a cutaway portion 48 for partially exposing the greenery cutting blades 30 as they rotate, so that the blades 30 may cut grass, weeds, shrubs and the like from this vantage point. Preferably, the components of the greenery cutter 24, adapter cylinder 36 and guard housing 42 are constructed of an inexpensive though durable plastic material.

Figure 4:
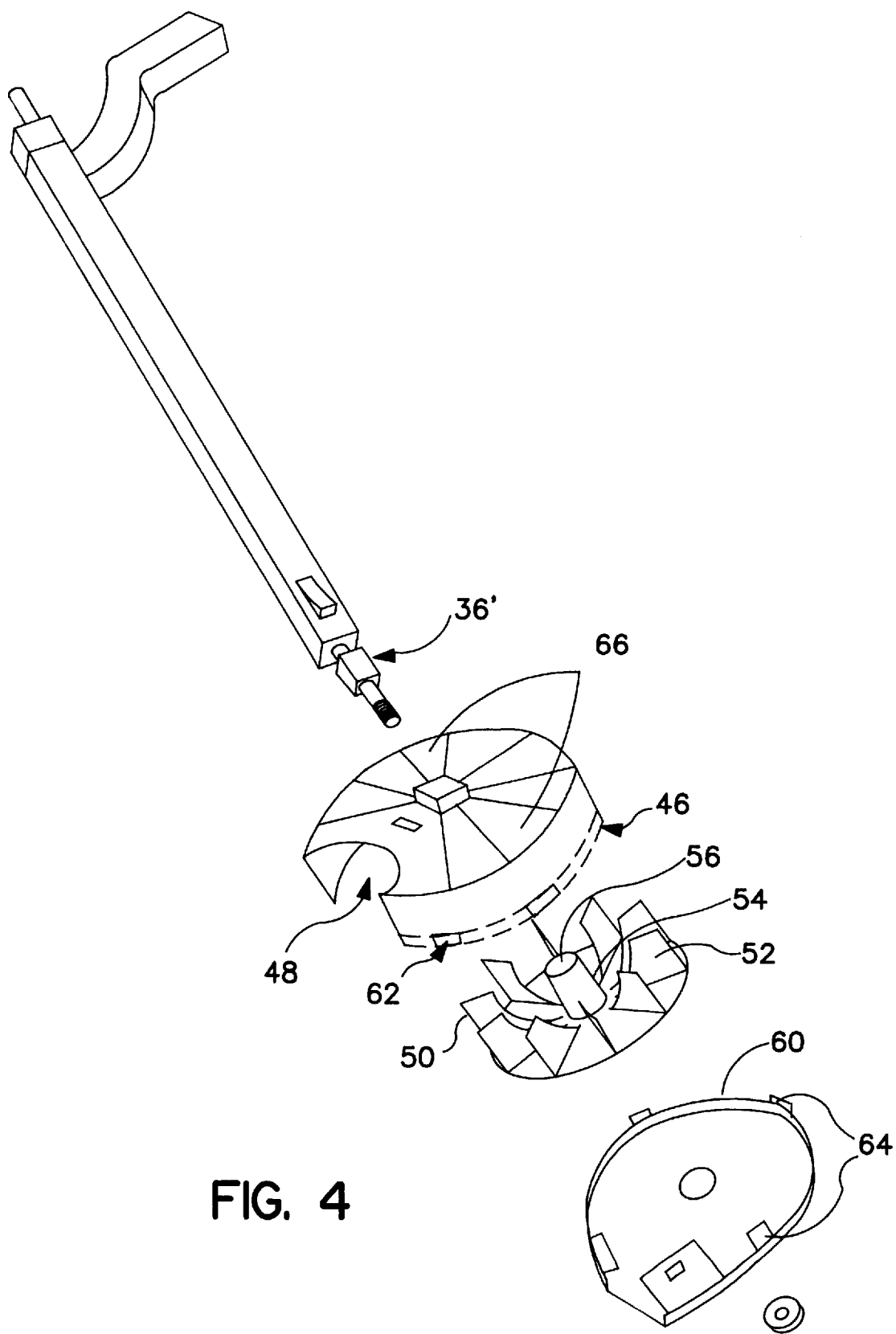
FIG. 4 is a perspective view of a landscaping device in accordance with the present invention, in which the rotatable implement is a blower.

Another example of a preferred rotatable implement is a blower 50, an example of which is illustrated in FIG. 4. In this example of a blower useful for blowing air for moving leaves, grass and dirt, the blower 50 has an impeller 52, and a cylindrical portion 54 with a bore 56 therethrough. Within the bore 56 of the cylindrical portion 54 is disposed a longitudinal key of the type described in connection with the greenery cutter 24. As illustrated in FIG. 4, in this embodiment, the blower 50 may be attached to the shaft 16 by use of the adapter cylinder 36, as previously described in reference to the greenery cutter 24.

A guard housing 42 is attached to the shaft housing 14 as previously described, covering one end of the blower 50. As FIG. 4 illustrates, a guard housing cover 60 is used, in cooperation with the guard housing 42, to completely enclose the blower 50, with the exception of the cutaway portion 48 of the lip portion 46 of the guard housing 42, from which air is to be blown. In this embodiment, the guard housing 42 preferably has a plurality of perforations 62 which may engage with a plurality of connection tabs 64 on the guard housing cover 60 for removably attaching the guard housing cover 60 to the guard housing 42. As previously described with reference to a greenery cutter 24, a fastener 38 is used to secure the blower 50 to the shaft 16 of the device 10.

The guard housing 42 may be modified to have additional perforations 66 to permit a large quantity air to be pulled into the impeller 52 upon its rotation in unison with the rotation of shaft 16, to improve the efficiency of the impeller 52 in forcing air out from the cutaway portion 48 of the lip portion 46 of the guard housing 42, for blowing leaves, grass, dirt and the like. Preferably, the impeller 52 and guard housing cover 60, as well as the guard housing 42 as previously described, are constructed of an inexpensive though durable plastic material.

Figure 5:
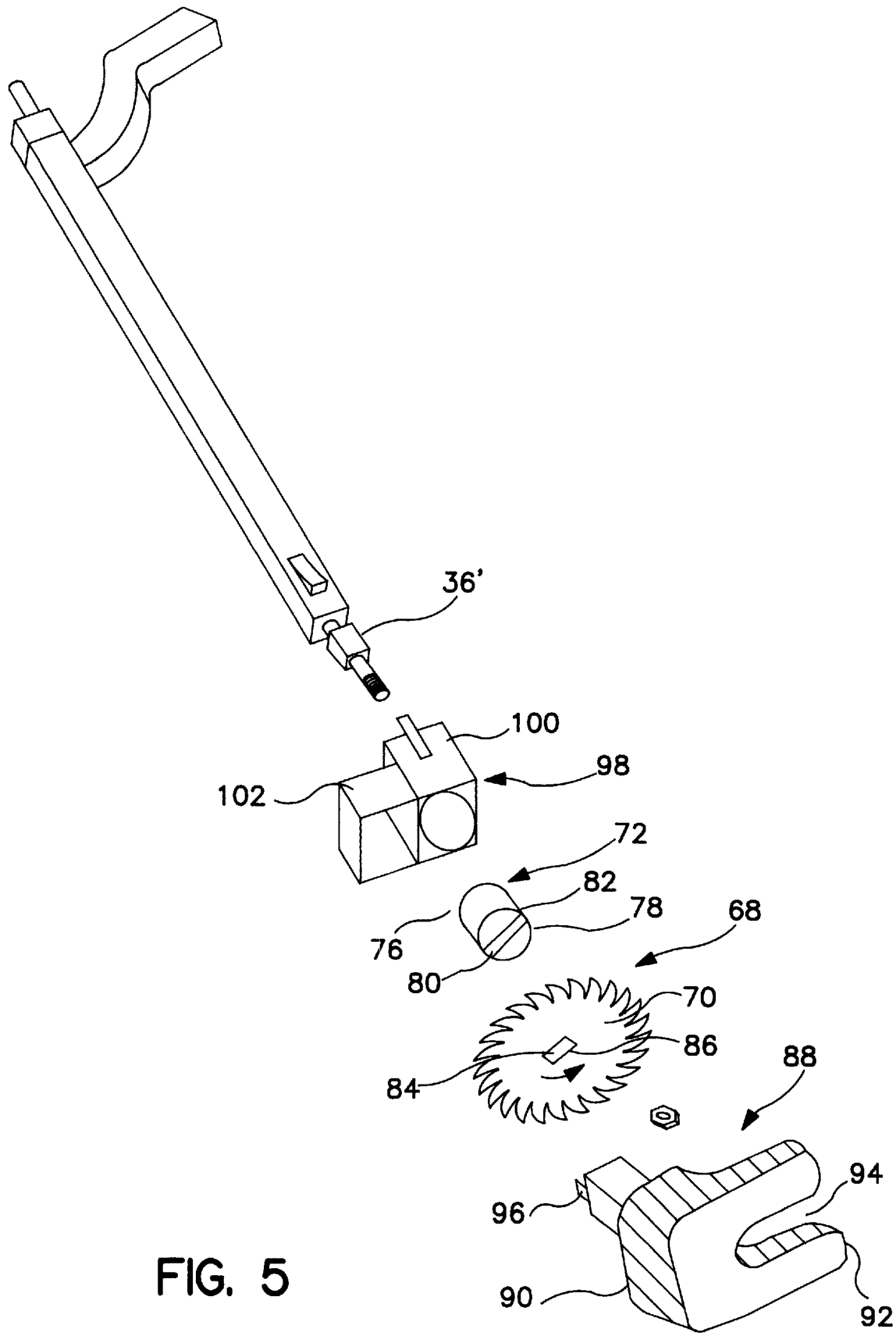
FIG. 5 is a perspective view of a landscaping device in accordance with the present invention, in which the rotatable implement is a pruner.

Turning now to FIG. 5, another example of a preferred rotatable implement is illustrated. In this embodiment, the rotatable implement is a pruner 68 comprised of a circular trimming saw 70. The trimming saw 70 may be attached to the shaft housing 14 through a cylindrical saw holder 72 which is configured to attach to an adapter cylinder 36, as previously described. The cylindrical saw holder 72 is open at one end 76 for engaging the adapter cylinder 36, and closed at the opposite end 78, although the closed end may have a hole 80 through which the shaft 16 can pass. A bore extends though the open end 76 of the saw holder 72 to its closed end 78, and a longitudinal key of the type described in connection with the greenery cutter 24 is disposed within the bore, for connecting the cylindrical saw holder 72 and the adapter cylinder 36.

The closed end 78 of the circular saw holder 72 also has a key 82 positioned radially on the exterior of the saw holder 72 for engaging the circular trimming saw 70, which has a center 84 and a slot 86 positioned radially about the center 84 for this purpose. As previously described with reference to a greenery cutter 24, a fastener 38 is used to secure the pruner 50 to the shaft 16 of the device 10.

In this example, a saw guard 88, as illustrated in FIG. 5, is preferably used. The saw guard 88 has a blade guard portion 90 which partially encompasses the trimming saw 70 in order to protect users from contact with the saw 70. The saw guard 88 also has a branch guide portion 92 which is open, permitting exposure of the trimming saw 70 to branches and the like to be pruned. The branch guide portion 92 has a channel 94 for guiding branches and the like to the trimming saw 70, and for preventing the device 10 from deflecting away from such branches while the branches are being cut by the trimming saw 70. Also preferably, the saw guard 88 has a latch 96 for securing the saw guard 88 to a saw guard mounting bracket 98 that connects to the shaft housing 14.

In particular, the saw guard 88 is preferably mounted to the shaft housing 14 using a saw guard mounting bracket 98 of the type illustrated in FIG. 5. The mounting bracket 98 has side-by-side adapter portions: a housing interface portion 100 and a guard interface portion 102. The housing interface portion 100 acts as an end cap, fitting on the end of the shaft housing 14, and removably attaching to the shaft housing 14 using the latch 22 of the shaft housing 14. The guard interface portion 102 is configured so as to engage the saw guard 88, as illustrated in FIG. 5, and connects to the saw guard 88 using the latch 96 of the saw guard 88. Preferably, the pruner 68, circular saw holder 72, saw guard 88 and saw guard mounting bracket are constructed of an inexpensive though durable plastic material, although it may be desirable to make the trimming saw 70 of other stronger materials such as metal.

Figure 7:
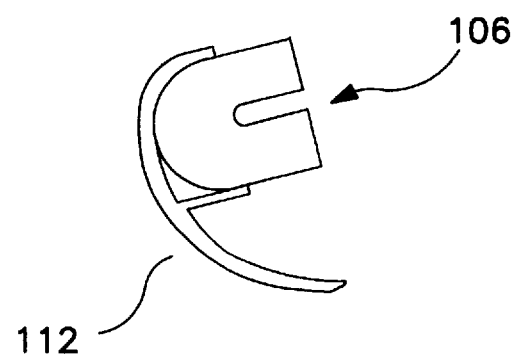
FIG. 7 is an orthographic end view taken along line 7—7 of FIG. 6.
Figure 6:
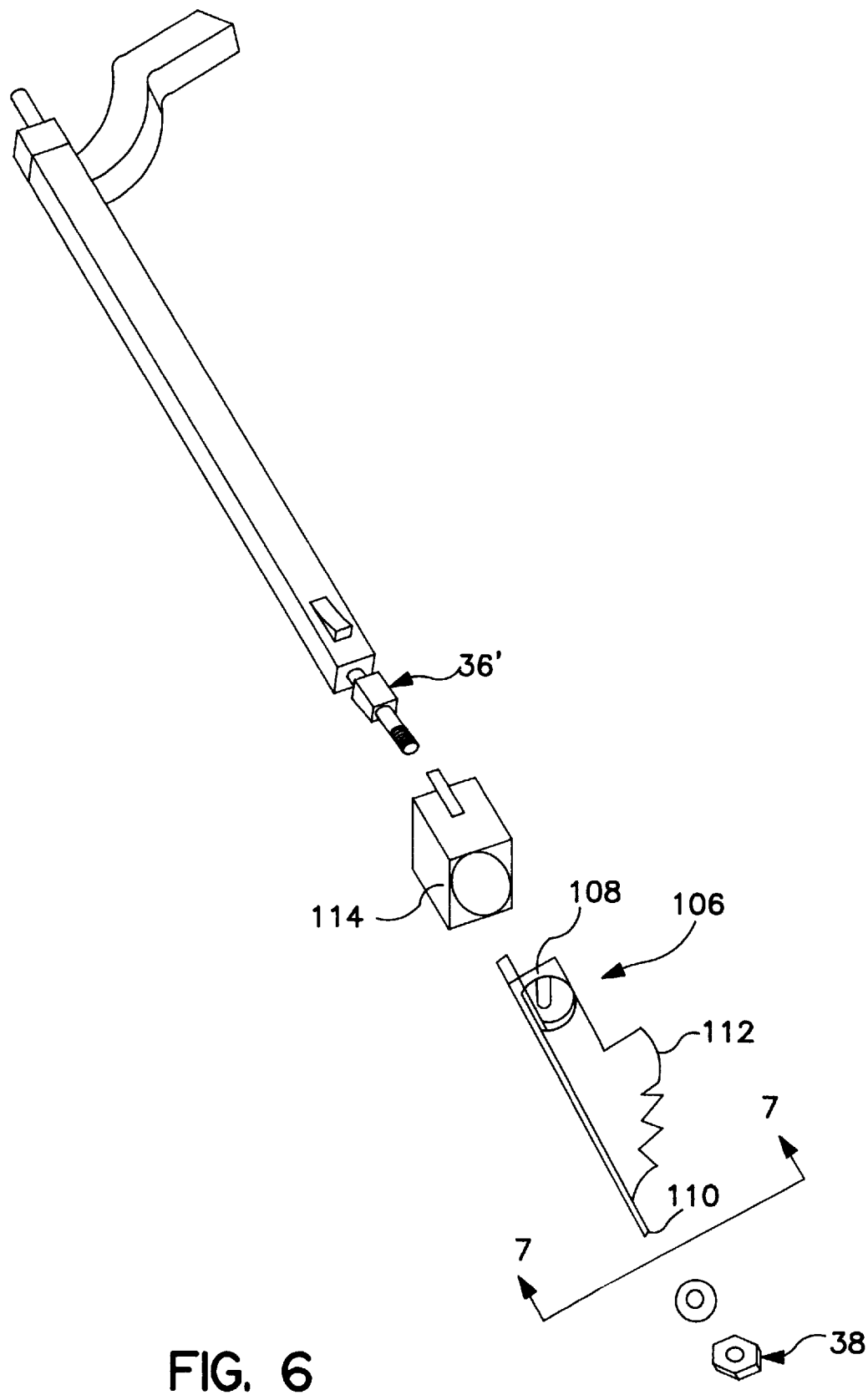
FIG. 6 is a perspective view of a landscaping device in accordance with the present invention, in which the rotatable implement is a weed extractor.

Yet another example of a preferred rotatable implement is a weed extractor 106, an example of which is illustrated in FIGS. 6 and 7. The first end 108 of the weed extractor 106 of this embodiment has a semi-cylindrical cross-section and is securable to the shaft 16 of the device 10, for example, by use of a fastener 38 as previously described with reference to the greenery cutter 24. The second end 110 of the weed extractor 106 comprises a blade 112 with teeth. The second end 110 is longitudinally curved, e.g., like the blade of a cook's utility knife, as can be seen in FIG. 6, and is laterally curved, as can be seen in FIG. 7. The weed extractor 106 may be used in conjunction with a second end cap 114 configured to be positioned over the adapter cylinder 36 and to be secured by the latch 22 of the device 10.

Of course, although FIGS. 6 and 7 illustrate a blade 112 adapted for weed extraction in one direction of shaft 16 rotation only, such a blade may be designed for weed extraction in the opposite direction, or in both directions, as will be obvious to one having skill in the art. As described in the example of this embodiment presented, the weed extractor 106 will rotate with the shaft 16 upon action of the drill 12 which, for best results, should be operated at its slowest speed. The weed extractor 106 can be used vertical to the ground to be weeded, or at various angles as determined by the user in a given situation. Preferably, as with the other embodiments herein, the second end cap 114 and weed extractor 106 are made of an inexpensive and durable plastic, although it may be desirable to make the weed extractor 106 of other stronger materials such as metal for weeding hard soils, or soils which are particularly rock or root-laden.

Figure 8:
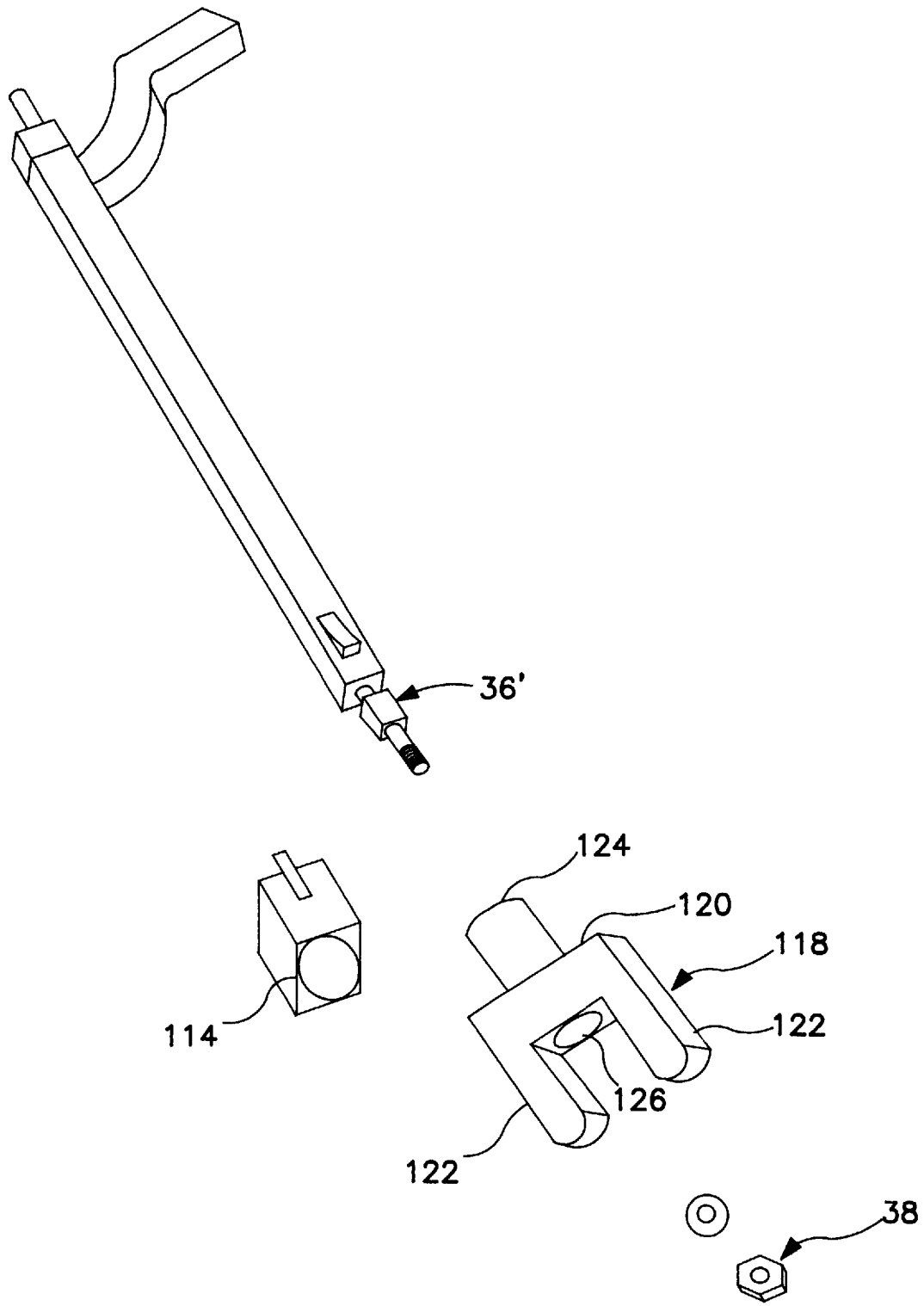
FIG. 8 is a perspective view of a landscaping device in accordance with the present invention, in which the rotatable implement is a soil augur and cultivator.

A final example of a preferred rotatable implement is a soil augur 118, an example of which is illustrated in FIG. 8. A soil augur of the type according to this invention has the capability of digging holes in soil, cultivating and turning soil, and has various other uses as will become obvious to those skilled in the art. The soil augur 118 is comprised of a base portion 120, a plurality of auguring blades 122, which may simply be a single blade having several teeth, and a cylindrical portion 124. The auguring blades 122 extend longitudinally away from the base portion 120 for contact with soil, and the cylindrical portion 124 extends longitudinally away from the base portion 120 in the opposite direction. The cylindrical portion 124 is attached perpendicularly to the base portion 120, and has a bore 126 extending longitudinally through it. A key similar to that in the example of the greenery cutter 24 is longitudinally positioned in the bore of the cylindrical portion 124 to permit connection to the adapter cylinder 36.

As previously described with reference to a greenery cutter 24, a fastener 38 is used to secure the soil augur 118 to the shaft 16 of the device 10. The soil augur 118 may be used in conjunction with a second end cap 114, of the type described in reference to the weed extractor 106, configured to be positioned over the adapter cylinder 36 and to be secured by the latch 22 of the device 10. Preferably, the soil augur 118 is constructed of an inexpensive though durable plastic material, although it may be desirable to make the auguring blades 122 of other stronger materials such as metal for working hard soils, or soils which are particularly rock or root-laden.

While there is shown and described herein certain specific structures comprising aspects of the invention, it will be manifest to those skilled in the art that various modifications and rearrangements of the parts may be made without departing from the spirit and scope of the underlying inventive concept, and that the same is not limited to the particular forms herein shown and described except insofar as indicated by the scope of the claims that follow.

What is claimed is:

1. A multi-purpose landscaping device powered by a hand-held rotary power tool, said landscaping device comprising:

a shaft having a first end and a second end;

an elongated shaft housing having a first end and a second end, said shaft being longitudinal and rotatably supported within said shaft housing with said first end of said shaft extending beyond said first end of said shaft housing and said second end of said shaft extending beyond said second end of said shaft housing;

a rotatable implement coupled to said second end of said shaft;

said first end of said shaft being configured for removable and operative connection to a hand-held rotary power tool, the power tool imparting rotary motion to said shaft; and a fastener, said fastener removably attaching said rotatable implement to said second end of said shaft for rotation therewith, such that said rotatable implement is interchangeable with another implement to vary the end use of said landscaping device.

2. The multi-purpose landscaping device of claim 1, wherein said rotatable implement is selected from the group consisting of a greenery cutter, a blower, a pruner, a soil augur, and a weed extractor.

3. The multi-purpose landscaping device of claim 1, wherein said rotatable implement is constructed from plastic.

4. The multi-purpose landscaping device of claim 1, wherein said rotatable implement comprises a greenery cutter having a base portion and a plurality of greenery cutting blades removably attached to said base portion for rotation therewith.

5. The multi-purpose landscaping device of claim 1, wherein said rotatable implement comprises a blower having an impeller.

6. The multi-purpose landscaping device of claim 1, wherein said rotatable implement comprises a pruner having a circular trimming saw.

7. The multi-purpose landscaping device of claim 6, further comprising:

a saw guard having a blade guard portion partially encompassing said trimming saw and a branch guide portion permitting exposure of said trimming saw, said branch guide portion further comprising a guide channel; and a mounting bracket having a shaft housing interface portion shaped to fit on said shaft housing and a guard interface portion configured to engage said saw guard, said mounting bracket thereby removably mounting said saw guard to said gardening device proximate to said second end of said shaft.

8. The multi-purpose landscaping device of claim 1, wherein said rotatable implement comprises a weed extractor, said weed extractor having:

a first end having a semicylindrical cross-section and being adapted for removable compiling to said shaft proximate to said second end of said shaft, for rotation of said implement with said shaft; and a second end having a blade, said blade being longitudinally and laterally curved and having a plurality of teeth.

9. The multi-purpose landscaping device of claim 1, wherein said rotatable implement comprises a soil augur having a base portion and a plurality of auguring blades integral to said base portion and disposed longitudinally therefrom, away from said second end of said shaft.

10. A multi-purpose landscaping device powered by a hand-held rotary power tool, said landscaping device comprising:

an elongated shaft housing enclosing a longitudinal chamber, said shaft housing having a first end and a second end;

a latch positioned on said shaft housing proximate to said second end of said shaft housing;

a shaft having a first end and a second end, said shaft being longitudinally and rotatably supported in said longitudinal chamber, said first end of said shaft extending beyond said first end of said shaft housing and being configured for removable and operative connection to said hand-held rotary power tool, said second end of said shaft extending beyond said second end of said shaft housing;

a rotatable implement directly coupled to said second end of said shaft; and a fastener, said fastener removably attaching said rotatable implement to said second end of said shaft for rotation therewith, such that said rotatable implement is interchangeable with another rotatable instrument to vary the end use of said landscaping device.

11. The multi-purpose landscaping device of claim 10 wherein said rotatable implement is selected from the group consisting of a greenery cutter, a blower, a pruner, a soil augur, and a weed extractor.

12. The multi-purpose landscaping device of claim 10, wherein said rotatable implement is constructed from plastic.

13. The multi-purpose landscaping device of claim 10, further comprising an adapter cylinder having an exterior surface, said exterior surface having a longitudinal slot formed therein, said adapter cylinder further having a bore therethrough forming a cylinder interior surface, said shaft being inserted through said bore such that said adapter cylinder is mounted proximate to said second end of said shaft for rotation of said adapter cylinder therewith.

14. The multi-purpose landscaping device of claim 13, further comprising a guard housing having a first end and a second end, said first end of said guard housing being configured for cooperative engagement with said latch of said shaft housing, and said second end of said guard housing having a circular outer lip portion surrounding said rotatable implement, said outer lip portion having a cutaway portion therein for partially exposing said rotatable implement.

15. The multi-purpose landscaping device of claim 14, wherein said rotatable implement comprises a greenery cutter having a base portion, a cylindrical portion fixedly and perpendicularly attached to said base portion and having a bore there-through, said bore having a key longitudinally positioned therein for removable engagement with said longitudinal slot of said adapter cylinder and a plurality of greenery cutting blades removably attached to said base portion for rotation therewith.

16. The multi-purpose landscaping device of claim 14, wherein:

said rotatable implement comprises a blower having an impeller, said impeller having an axial cylindrical portion with a bore formed therethrough, said bore having a key longitudinally positioned therein for cooperative engagement with said longitudinal slot of said adapter cylinder;

said outer lip portion of said guard housing further comprises a plurality of perforations; and said multi-purpose landscaping device further comprises a guard housing cover having a plurality of connection tabs for cooperation with said perforations of said guard housing outer lip portion for removable attachment of said cover to said guard housing.

17. The multi-purpose landscaping device of claim 13, wherein said rotatable implement comprises a pruner having a circular trimming saw having a center and a slot positioned at said center.

18. The multi-purpose landscaping device of claim 17, further comprising:

a cylindrical saw holder having a bore therethrough and an open end and a closed end, said bore having a key longitudinally positioned therein for cooperative engagement with said longitudinal slot of said adapter cylinder;

said closed end of said cylindrical saw holder having a bore therein adapted to accept said shaft therethrough, said closed end further having a key radially positioned for cooperation with said slot of said trimming blade;

a saw guard having a blade guard portion partially encompassing said trimming saw, a branch guide portion permitting exposure of said trimming saw, said branch guide portion further comprising a channel for guiding and laterally securing said objects for action thereon by said trimming saw, and a guard attachment portion having a latch; and a saw guard mounting bracket having a housing interface portion and a guard interface portion, said housing interface portion of said mounting bracket being configured for cooperative engagement with said latch of said shaft housing, and said guard interface portion being configured for cooperative engagement with said latch of said guard attachment portion of said saw guard.

19. The multi-purpose landscaping device of claim 13, wherein said rotatable implement comprises a soil augur having a base portion, a cylindrical portion fixedly and perpendicularly attached to said base portion, said cylindrical portion having a bore therethrough, said bore having a key longitudinally positioned therein for removable engagement of said rotatable implement with said longitudinal slot of said adapter cylinder, and a plurality of auguring blades fixedly attached to said base portion and disposed longitudinally therefrom, away from said cylindrical portion and said second end of said shaft.

20. The multi-purpose landscaping device of claim 10, wherein said rotatable implement comprises a weed extractor having:

a first end having a semi-cylindrical cross-section and being adapted for fixedly and removably connecting said weed extractor to said shaft proximate to said second end of said shaft, for rotation of said implement with said shaft; and a second end having a blade, said blade being longitudinally and laterally curved, and having a plurality of teeth.

21. A multi-purpose landscaping device for use with a hand-held rotary power tool, said landscaping device comprising:

a shaft housing enclosing a longitudinal chamber, said shaft housing having a first end and a second end, and a latch, said latch being positioned on said shaft housing proximate to said second end of said shaft housing;

a shaft having a first end and a second end, said shaft being longitudinally and rotatably supported in said chamber;

a rotatable implement coupled to said second end of said shaft;

said first end of said shaft being configured for removable and operative connection to a hand-held rotary power tool;

a fastener for removably attaching said rotatable implement to said second end of said shaft for rotation therewith;

an adapter cylinder having an exterior surface, said exterior surface having a longitudinal slot formed therein, said adapter cylinder further having a bore formed therethrough forming a cylinder interior surface, said shaft being inserted through said bore such that said adapter cylinder is mounted proximate to said second end of said shaft for rotation of said adapter cylinder therewith; and a guard housing having a first end and a second end, said first end of said guard housing being configured for cooperative engagement with said latch of said shaft housing, and said second end of said guard housing having a circular outer lip portion surrounding said plane of rotation of said rotatable implement, said outer lip portion having a cutaway portion therein for partially exposing said rotatable implement.

22. The multi-purpose device of claim 21, wherein said rotatable implement comprises a greenery cutter having a base portion, a cylindrical portion fixedly and perpendicularly attached to said base portion and having a bore therethrough, said bore having a key longitudinally positioned therein for removable engagement with said longitudinal slot of said adapter cylinder, and a plurality of greenery cutting blades removably attached to said base portion for rotation therewith.

23. The multi-purpose device of claim 21, wherein:

said rotatable implement comprises a blower having an impeller having an axial cylindrical portion with a bore therethrough, said bore having a key longitudinally positioned therein for cooperative engagement with said longitudinal slot of said adapter cylinder;

said outer lip portion of said guard housing further comprises a plurality of perforations; and said multi-purpose device further comprises a guard housing cover having a plurality of connection tabs for cooperation with said perforations of said guard housing outer lip portion for removable attachment of said cover to said guard housing.

* * * * *